United States Patent [19]

Heichele et al.

[11] 3,996,173
[45] Dec. 7, 1976

[54] IMPACT RESISTANT THERMOPLASTIC PVC MOLDING COMPOSITION

[75] Inventors: Friedrich Heichele; Johann Bauer, both of Burghausen; Helmut Wimmer, Winhoring, all of Germany

[73] Assignee: Wacker-Chemie GmbH, Burghausen, Germany

[22] Filed: Sept. 23, 1974

[21] Appl. No.: 508,196

[30] Foreign Application Priority Data

Sept. 25, 1973 Germany ............................ 2348177

[52] U.S. Cl. ........................ 260/23 XA; 260/42.49
[51] Int. Cl. ............................................ C08l 91/00
[58] Field of Search .................... 260/23 TA, 42.49

[56] References Cited
UNITED STATES PATENTS

| | | | |
|---|---|---|---|
| 3,382,198 | 5/1968 | Elslager | 260/23 |
| 3,479,309 | 11/1969 | Hecker | 260/23 |

*Primary Examiner*—Lewis T. Jacobs
*Assistant Examiner*—William E. Parker
*Attorney, Agent, or Firm*—Hammond & Littell

[57] ABSTRACT

An impact resistant thermoplastic molding composition comprising
 a. 80% to 98% by weight of polyvinyl chloride,
 b. 2% to 20% by weight of a modifying resin for improving the impact strength, characterized by an additional content of,
 c. 2% to 30% by weight, based on PVC, of a coated calcium carbonate, the surface of which has been treated with stearic acid and which has a particle size of 0.04 to 0.1 $\mu$.

The composition is useful for preparing shaped articles, such as hollow articles.

8 Claims, No Drawings

IMPACT RESISTANT THERMOPLASTIC PVC MOLDING COMPOSITION

THE PRIOR ART

Molded articles made of rigid polyvinyl chloride have, in general, a poor notch impact strength. In order that this drawback is avoided, various modifying resins are added to the polyvinyl chloride before forming the same into shaped articles. Examples of such resins are acrylonitrile-butadiene-styrene copolymerizates, methacrylate-butadiene-styrene chlorinated polyethylene or sulfochlorinated polyethylene, ethylene — vinyl ester copolymers, or acrylate copolymers. The addition of these polymers results in a considerable improvement in the impact strength of the molded compositions, however, the amounts which have to be used are a considerable cost factor in cost for the total mixture.

Furthermore, the use of 1% to 30% by weight of a finely divided powder of coated calcium carbonate for rigid polyvinyl chloride mixtures is described in the German patent specification DAS No. 1,469,886. The impact strength is determined by a Swedish standard, according to which the impact of falling weight on extruded tubes is measured. However, this test showed that the notch impact strength values obtained with this mixture are not sufficient for most fields of application.

OBJECTS OF THE INVENTION

It is an object of the present invention to provide impact resistant thermoplastic compositions which meet higher requirement and which overcome the above-discussed problems.

It is another object of the present invention to provide an impact resistant thermoplastic molding composition consisting of
 a. 80 to 98% by weight of polyvinyl chloride
 b. 2 to 20% by weight of a modifying resin for improving the impact strength, characterized by an additional content of
 c. 2 to 30% by weight, based on PVC, of a coated calcium carbonate, the surface of which has been treated with stearic acid, and which has a particle size of 0.04 to 0.1 $\mu$.

These and further objects of the present invention will become apparent as the description theroef proceeds.

DESCRIPTION OF THE INVENTION

The present invention provides impact resistant thermoplastic compositions which meet higher requirements.

The present invention further provides impact resistant thermoplastic molding compositions consisting of
 a. 80 to 98% by weight of polyvinyl chloride,
 b. 2 to 20% by weight of a modifying resin for improving the impact strength, characterized by an additional content of,
 c. 2 to 30% by weight, based on PVC, of a coated calcium carbonate, the surface of which has been treated with stearic acid, and which has a particle size of 0.04 to 0.1 $\mu$.

More particularly, the present invention provides an impact resistant thermoplastic molding composition consisting essentially of
 A. from 80 to 98% by weight of a vinyl chloride polymer derived from monomers selected from the group consisting of (a) from 90 to 100% by weight of vinyl chloride and (b) from 0 to 10% by weight of a monomer copolymerizable with vinyl chloride, and
 B. from 2 to 20% by weight of a modifying resin for increasing the impact resistance, having a further content of
 C. from 2 to 30% by weight, based upon the weight of said vinyl chloride polymer of a coated calcium carbonate powder, the surface of said powder coated with stearic acid, and said powder having a particle size of 0.04 to 0.1 $\mu$, and
 D. from 0 to 10% by weight, based upon the weight of said vinyl chloride polymer of conventional molding composition additive ingredients.

In addition, the present invention provides an improvement in the process for preparing a shaped article comprising providing a thermoplastic molding mixture, forming said thermoplastic molding mixture into said shaped article and recovering said shaped article; wherein the improvement comprises utilizing the above-described impact resistant thermoplastic molding composition, as said thermoplastic molding mixture.

The thermoplastic molding composition according to the invention has these advantages. The ingredients used according to the invention results in a thermoplastic composition which shows a synergistic increased effect with respect to notch impact strength as compared with the known prior art impact resistant mixtures. This effect could not be anticipated by one skilled in the art, because there does not exist any common mechanism between the effect of modifying resins on the impact strength of thermoplastics, and the effect of fillers on the impact strength of thermoplastics, such as coated calcium carbonate fillers. Instead, one had to expect that not even a simple additive effect can be achieved, since a mutual impairment of the two additives was to be anticipated.

The thermoplastic molding compositions according to the invention have the additional advantage of economy, since the use of the coated calcium carbonate reduces the manufacturing costs for the total mixture. Moreover, the mixtures show good stiffness (E-modulus), hardness, and tensile strength.

As polyvinyl chloride, all the customary polyvinyl chloride products can be used, such as mass polymerized PVC, emulsion polymerized PVC and suspension polymerized PVC, of which amounts ranging from 85 to 95% by weight are used. It is also possible to use copolymers derived from vinyl chloride and small amounts of $\alpha$-ethylenically unsaturated monomers copolymerizable therewith, up to 10% by weight, for example, vinyl acetate, vinylidene chloride and vinyl propionate.

The modifying resins improving the impact strength are usually rubber-like polymer substances. Examples of such modifying resins are acrylonitrile - butadiene - styrene copolymers, acrylate copolymers, long-chained fumarate copolymers, and especially butadiene - styrene - methacrylate copolymers and/or ethylene - vinyl ester copolymers, such as ethylene - vinyl acetate copolymers, or chlorinated polyethylene or sulfochlorinated polyethylene. In many cases, vinyl chloride is graft-polymerized onto the modifying resins; and they are then used as graft copolymers. In general, the modifying resins improving the impact strength cause the PVC to reach a notch impact strength according to DIN 53453 that amounts to at least 4 cm. kp/cm². Such modifying resins are the ones which, for the most part, are used according to the invention. The preferred range of the added amount varies, depending upon the modifying resin. For example, 5 to 20% by weight is the amount used in the case of acrylonitrile - butadiene - styrene (ABS) copolymers, as well as for methacrylate - butadiene - styrene (MBS) copolymers. In the case of ethylene - vinyl ester (EVE) copolymers, the amount used is from 2 to 10% by weight; and in the case of chlorinated polyethylene (CPE) the amount used is from 5 to 20% by weight. In most cases, the amount used lies between 5 to 15% by weight.

The calcium carbonate coated with stearic acid is a commercially available product sold under the name of "Winofil S" (of ICI) or "Socal U1 S2" (of Solvay). It contains 1 to 5% by weight of stearic acid, and the balance is calcium carbonate. The coated powder has a uniform particle size of 0.04 to 0.1 $\mu$. The specific surface area is, in general, 10 to 50, preferably 15 to 30 m$^2$/g. The amount customarily used is 2 to 30% by weight, preferably 10 to 25% by weight, based on the amount of the polyvinyl chloride.

Optionally, the thermoplastic molding composition can contain the usual additive ingredients in an amount from 0 to 10% by weight, such as for instance, stabilizers of which the amount of 0 up to 3%, preferably 0.5 to 3% by weight, based on PVC, can be used. Examples of stabilizers are barium-cadmium stabilizers, lead compounds, organic tin compounds; lubricants and processing auxiliaries, for example, montan waxes, esters of long-chain fatty acids, calcium and magnesium salts of long-chain fatty acids, higher fatty alcohols, polyethylenes, organic polysiloxanes and acrylates; as well as coloring compounds, for instance, inorganic pigments, such as for example, titanium dioxide, carbon black, cadmium colors, iron oxide colors, or organic dyestuffs, such as for instance, phthalocyanine blues, for example, chromophthalocyanine blue. Only small quantities of plasticizers are used since for the most part, rigid PVC mixtures are involved in the molding compounds of the invention.

For the manufacture of the molding compositions, the usual mixing devices can be used, such as for example, drum mixers, fluid mixers, or impellers. The processing of the product can start with a powder or after granulation.

The preferred uses for the molding compositions are in the manufacture of shaped articles such as hollow articles, for example, bottles, cups, pans, or tumblers. Further, fields of application comprise the production of plates, sheets, sheetings and sections.

The following examples are merely illustrative of the present invention without being deemed limitative in any manner thereof.

EXAMPLE 1

Experiment (A)

100 parts of polyvinyl chloride (K-value = 57) were mixed in a Henschel fluid mixer, at a temperature of about 130° C, with 1.5 parts of dioctyltin thioglycol ester, 0.2 parts of a partially saponified montanic acid ester wax, 0.1 parts of low-molecular polyethylene wax, 0.6 parts of glycerol monoricinoleate, and 2 parts of a processing auxiliary based on a modified acrylate (K 120 N of Rohm and Haas).

a. This mixture was milled on mixing rolls at 160° C for 5 minutes, and the rough sheets were compression molded at 175° C for 10 minutes under a pressure of 200 atm. to form sheets of 4 mm thickness serving for the preparation of test specimens.

| Notch Impact Strength (NIS) at Various Temperatures (T) | |
|---|---|
| T in ° C | NIS in cm kp/cm$^2$ |
| 22 | 2.0 |
| 0 | 1.9 |
| −20 | 2.0 |
| −40 | 2.1 | b. The powdery mixture capable of trickling was processed in a bottle blowing machine having a 60 mm screw of 20 D length and a compression of 1:1.85 to form 0.7 liter bottles. The bottles were subjected to a progressive drop test in which the filled bottles were first tempered and then dropped vertically at 0° C whereby the drop height started at 50 cm and was increased each time by 10 cm until break occured. The drop height at which 50% of the bottles broke was computed statistically.

$\sigma$ = standard deviation, V = variation coefficient.

Drop Values of Bottles $h_{50}(m) = 0.67$;
$\sigma(m) = 0.25$;
$V(\%) = 37.3$; and
$\sigma h_{50}(m) = 0.08$ For practical purposes, the bottles were not sufficiently resistant to breakage due to dropping, since breakage was 100% at 1.2 m.

Experiment (B)

90 parts of polyvinyl chloride (K-value = 57) and 10 parts of calcium carbonate coated with stearic acid and having a particle size of 0.075 $\mu$ were mixed with the same additives as in Experiment (A) above.

a. The mixture was compression molded to form sheets using a procedure analogous to that described above in Experiment (A) (a)

| Notch Impact Strength (NIS) at Various Temperatures (T) | |
|---|---|
| T in ° C | NIS in cm kp/cm$^2$ |
| 22 | 2.5 |
| 0 | 2.3 |
| −20 | 2.1 |
| −40 | 2.0 | b. The mixture was processed in a bottle blowing machine using a procedure analogous to that described above in Experiment (A)(b).

Drop Values of Bottles at 0° C $h_{50}(m) = 0.75$;
$\sigma \pm (m) = 0.17$;
$V \pm (\%) = 22.7$;
$\sigma h_{50}(m) = 0.05$.

The breakage is 93% at 1.2 m. The bottles were not sufficiently resistant to breakage by dropping. The improvement due to the addition of chalk is minimal.

Experiment (C)

100 parts of polyvinyl chloride (K-value = 57) and 15 parts of methacrylate - butadiene - styrene copolymer (MBS, Kane Ace, of Kanegafuchi) were mixed with the other constituents of the formulation as described above in Experiment (A).

a. The impact-resistant modified mixture is compression molded as described above in Experiment (A)(a) to form sheets.

| Notch Impact Strength (NIS) at Various Temperatures (T) | |
|---|---|
| T in ° C | NIS in cm kp/cm$^2$ |
| 22 | 27.6 incipient fracture |
| 0 | 6.3 |
| −20 | 3.8 |
| −40 | 3.3 | b. The mixture is processed in the bottle blowing machine as in Experiment (A)(b).

Drop Values of the Bottles at 0° C $h_{50}$ (m) = 2.30
$\sigma \pm$ (m) = 0.54
$V \pm$ (%) = 23.5
$\sigma h_{50} \pm$ (m) = 0.1

The procedure used was analogous to that in Experiments (A) and (B). The starting height was 1.20 m. The height of drop was increased by 20 cm each time.

The bottles made from the MBS modified mixture were considerably more resistant to drop than those made from the unmodified mixture (Experiment A) and those made from the mixture provided with the addition of chalk (Experiment B).

EXPERIMENT D 90 parts of polyvinyl chloride (K-value = 57), 15 parts of MBS (Kane Ace), and 10 parts of calcium carbonate as in Experiment (B) above were mixed with the same additives as described in Experiment (A) to form a mixture according to the invention.

a. The mixture was compression molded to form sheets as has been described in the preceding experiments.

| Notch Impact Strength (NIS) at Various Temperatures (T) | |
|---|---|
| T in ° C | NIS in cm kp/cm$^2$ |
| 22 | 40.7 starts to break |
| 0 | 10.4 |
| −20 | 6.0 |
| −40 | 3.2 | b. The mixture was processed in a bottle blowing machine.

Drop Values: (0° C)

$h_{50}$ (m) > 3

From 3 meters, not one bottle was broken.

The bottles made from the mixture according to the invention showed a considerable increase in the resistance to breakage by dropping, as compared with those used in Experiment (C).

EXAMPLE 2

The following basic composition was used to prepare sheets by milling at 160° C for 5 minutes and by compression molding at 175° C for 10 minutes. All parts are by weight unless otherwise indicated.

70 to 100 parts of mass-PVC (bulk polymerized) having a K-value of 57;
0 to 15 parts of methacrylate - butadiene - styrene copolymer (MBS Kane Ace);
0 to 30 parts of calcium carbonate with 2.6% stearic acid and a particle size of 0.075 $\mu$ ("Winofil S" of ICI);
1.5 parts of stabilizer (dioctyltin dithioglycolic acid ester - glycerol monofatty acid ester;
0.2 parts of partially saponified montan wax;
0.1 parts of polyethylene wax;
0.6 parts of glycerol monoricinoleate; and
2.0 parts of modified acrylate.

This basic composition was used for three series of experiments, whereby the first series did not contain any modifying resin, the second series contained 5 parts of modifying resin, and the third series contained 15 parts of modifying resin. Within each series, six experiments were conducted whereby the amount of calcium carbonate coated with stearic acid ranged between 0 and 30 parts by weight. Table I lists the values for the impact strength of the test specimens. Table I indicates that the use of both additives results in a synergistic increase of the impact strength.

TABLE I

| | 0 Parts MBS | | | | | | 5 Parts MBS | | | | | | 15 Parts MBS | | | | | |
|---|---|---|---|---|---|---|---|---|---|---|---|---|---|---|---|---|---|---|
| PVC/CaCO$_3$ Ratio | 100 | 95/5 | 90/10 | 85/15 | 80/20 | 70/30 | 100 | 95/5 | 90/10 | 85/15 | 80/20 | 70/30 | 100 | 95/5 | 90/10 | 85/15 | 80/20 | 70/30 |
| Notch Impact Strength cm kp/cm$^2$ | | | | | | | | | | | | | | | | | | |
| at 22° C | 2.2 | 2.1 | 2.9 | 3.7 | 3.9 | 4.2 | 2.5 | 4.4 | 5.2 | 6.7 | 7.4 | 6.3 | 29.7 | 31.8 | 39.6 | 30.1 | 13.6 | 8.4 |
| at 0° C | 1.6 | 1.2 | 1.2 | 1.3 | 1.7 | 2.0 | 1.4 | 1.1 | 1.7 | 4.1 | 3.6 | 3.3 | 6.7 | 8.5 | 10.9 | 9.3 | 5.6 | 4.4 |
| at −20° C | | | | | | | | | | 2.9 | 2.9 | 1.8 | 4.2 | 5.0 | 5.7 | 4.6 | 3.1 | 2.0 |
| at −40° C | | | | | | | | | | 2.2 | 1.9 | | 3.0 | 3.2 | 3.3 | 2.6 | 1.9 | |
| Shore D-Hardness | 83 | 83 | 83 | 83 | 85 | 84 | 80 | 82 | 81 | 82 | 83 | 82 | 79 | 80 | 81 | 80 | 81 | 81 |

EXAMPLE 3

Experiment (A)

For the preparation of a molding composition, the following ingredients were mixed at 160° C for 5 minutes:

100 parts of mass-PVC having a K-value of 57;
1.5 parts of a stabilizer (dioctyltin dithioglycolic acid ester - monoester of glycerol with fatty acid);
0.2 parts of a partially saponified montan ester wax;
0.1 parts of polyethylene wax having a molecular weight of about 9000;
0.6 parts of glycerol monoricinoleate; and
2.0 parts of modified acrylate.

This molding composition was processed by compression molding at 175° C for 10 minutes to form a sheet.

Experiment (B)

The same composition was used as described in Experiment (A) above, except that 15 parts of an acrylonitrile - butadiene - styrene copolymer ("Blendex 301") was also charged.

Experiment (C)

In this composition, 15 parts of the ABS resin of (B) were replaced with 10 parts of calcium carbonate coated with stearic acid ("Winofil S").

Experiment (D)

Calcium carbonate coated with stearic acid as well as the modifying ABS resin were charged in this mixture. The results were reported below in Table II.

TABLE II

| Notch Impact Strength cm kp/cm² | Experiment | | | |
|---|---|---|---|---|
| | A | B | C | D |
| at 23° C | 2.2 | 3.0 | 2.7 | 8.0 |
| at 0° C | 2.2 | 2.6 | 2.4 | 4.9 |
| at −20° C | — | 2.3 | 2.0 | 3.8 |
| at −40° C | — | 2.2 | — | 2.3 |

The above Table II indicates that a synergistic effect with respect to the notch impact strength is obtained when the modifying resin and the coated calcium carbonate are utilized in accordance to the present invention.

EXAMPLE 4

Composition (A)
100 parts of suspension polymerized PVC having a K-value of 65;
10 parts of ethylene - vinyl acetate copolymer (65% ethylene "Elvax 150", Dupont);
2.5 parts of powdery barium - cadmium stabilizer;
0.5 parts of sequestering agent (Mark C);
2.5 parts of octyl epoxystearate; and
0.5 parts of hydroxystearic acid.

Composition (B)
100 parts of the PVC in Composition (A) were replaced by 90 parts of PVC and 10 parts of calcium carbonate coated with stearic acid ("Winofil S").

Table III summarizes the notch impact strength values which were obtained by the testing of compression molded sheets, prepared by milling at 175° C for 5 minutes and by compression molding at 175° C for 10 minutes.

TABLE III

| Notch Impact Strength cm kg/cm² | Composition | |
|---|---|---|
| | A | B |
| at 23° C | 7.4 | 21.2 |
| at 0° C | 3.8 | 7.6 |
| at −20° C | 2.4 | 3.9 |
| at −40° C | 1.9 | 2.6 |
| E-Modulus | 22,200 | 22,300 |

This Table III indicates the synergistic effect with respect to the notch impact strength based upon the use of a composition according to the invention.

EXAMPLE 5

The compositions 5A and 5B which were used, corresponded to those used in Example 4, except that 10 parts of chlorinated polyethylene containing 35% chlorine ("Haloflex 235") was charged instead of 10 parts of ethylene - vinyl acetate copolymer. The notch impact strength values were determined and were reported in Table IV.

TABLE IV

| Notch Impact Strength cm kp/cm² | Composition | |
|---|---|---|
| | A | B |
| at 23° C | 7.6 | 0.3 |
| at 0° C | 3.5 | 4.1 |
| at −20° C | 2.8 | 3.5 |
| at −40° C | 2.5 | 3.2 |
| E-Modulus | 26,700 | 27,200 |

EXAMPLE 6

The basic composition of Example 1 was used for this example.

Composition (A)
100 parts of bulk-polymerized PVC having a K-value of 55, no modifying resin and no calcium carbonate.

Composition (B)
90 parts of the same PVC and 10 parts of calcium carbonate coated with stearic acid.

Composition (C)
100 parts of the same PVC, 10 parts of methacrylate - butadiene - styrene copolymer.

Composition (D)
90 parts of the same PVC, 10 parts of the same coated calcium carbonate and 10 parts of the same modifying resin.

Composition (E)
100 parts of bulk-polymerized PVC having a K-value of 70, no modifying resin, and no calcium cabonate.

Composition (F)
90 parts of PVC of Composition (E), 10 parts of calcium carbonate coated with stearic acid.

Composition (G)
100 parts of PVC of Composition (E), 10 parts of methacrylate - butadiene - styrene copolymer.

Composition (H)
90 parts of PVC of Composition E, 10 parts of calcium carbonate coated with stearic acid and 10 parts of the same modifying resin.

These eight compositions served for the preparation of the respective sheets by milling at 175° C for 5 minutes and compression molding at 175° C for 10 minutes. The measured impact strength values were reported in Table V.

TABLE V

| Notch Impact Strength cm kp/cm² | COMPOSITION | | | | | | | |
|---|---|---|---|---|---|---|---|---|
| | A | B | C | D | E | F | G | H |
| at 23° C | 2.2 | 2.2 | 5.9 | 8.8 | 3.3 | 5.1 | 13.1 | 17.9 |
| at 0° C | 2.1 | 2.3 | 4.0 | 4.2 | 3.0 | 3.2 | 7.6 | 9.2 |
| at −20° C | 2.1 | 1.8 | 3.5 | 3.2 | 2.9 | 2.9 | 5.7 | 5.3 |
| at −40° C | — | — | 2.6 | 2.2 | 2.8 | 2.3 | 4.2 | 3.6 |
| E-Modulus | 30900 | 34100 | 26900 | 29700 | 29400 | 32300 | 27300 | 26900 |

Even though the K-value has an effect on the impact strength, the additives according to the invention bring about a synergistic improvement in the notch impact strength values at a high K-value as well as at a low K-value.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. An impact resistant thermoplastic molding composition consisting essentially of
   A. from 80 to 98% by weight of a vinyl chloride polymer derived from monomers selected from the group consisting of (a) from 90 to 100% by weight of vinyl chloride and (b) from 0 to 10% by weight of a monomer copolymerizable with vinyl chloride, and
   B. from 2 to 20% by weight of a modifying resin for increasing the impact resistance, having a further content of
   C. from 2 to 30% by weight, based upon the weight of said vinyl chloride polymer, of a coated calcium carbonate powder, the surface of said powder coated with stearic acid, and said powder having a particle size of 0.04 to 0.1 $\mu$, and
   D. from 0 to 10% by weight, based upon the weight of said vinyl chloride polymer of a conventional molding composition additive ingredient.

2. The impact resistant thermoplastic molding composition of claim 1, wherein, in (C), there is from 10 to 25% by weight of said calcium carbonate powder, based upon the weight of said vinyl chloride polymer.

3. The impact resistant thermoplastic molding composition of claim 1, wherein, in (B), said modifying resin is selected from the group consisting of acrylonitrile - butadiene - styrene copolymers, acrylate copolymers, long-chain fumarate copolymers, butadiene - styrene - methacrylate copolymers, ethylene - vinyl ester copolymers, chlorinated polyethylene, sulfochlorinated polyethylene, ethylene - vinyl acetate copolymers, and the mixtures thereof.

4. The impact resistant thermoplastic molding composition of claim 1, wherein, in (B), said modifying resin is selected from the group consisting of methacrylate - butadien - styrene copolymer, acrylonitrile - butadiene - styrene copolymer, ethylene - vinyl acetate copolymer, chlorinated polyethylene, and mixtures thereof.

5. The impact resistant thermoplastic molding composition of claim 1, wherein, in (B), said modifying resin is a methacrylate - butadiene - styrene copolymer.

6. The impact resistant thermoplastic molding composition of claim 1, wherein, in (B), said modifying resin is an ethylene - vinyl acetate copolymer.

7. In the process for preparing a shaped article comprising providing a thermoplastic molding mixture, forming said thermoplastic molding mixture into said shaped article and recovering said shaped article; the improvement which comprises utilizing the impact resistant thermoplastic molding composition of claim 1, as said thermoplastic molding mixture.

8. The process of claim 7, wherein said shaped article is a hollow article.

* * * * *